(12) United States Patent
Hubina et al.

(10) Patent No.: US 6,757,012 B1
(45) Date of Patent: Jun. 29, 2004

(54) COLOR SELECTION FOR SPARSE COLOR IMAGE RECONSTRUCTION

(75) Inventors: Thomas Eugene Hubina, Simi Valley, CA (US); Craig Charles Reinhart, Moorpark, CA (US); Hung Yu Chou, Anaheim, CA (US)

(73) Assignee: Biomorphic VLSI, Inc., Thousand Oaks, CA (US)

( * ) Notice: Subject to any disclaimer, the term of this patent is extended or adjusted under 35 U.S.C. 154(b) by 0 days.

(21) Appl. No.: 09/482,270

(22) Filed: Jan. 13, 2000

(51) Int. Cl.[7] .............................................. H04N 5/228
(52) U.S. Cl. ..................... 348/222.1; 348/273; 382/300
(58) Field of Search .............................. 348/222.1, 272, 348/273, 276, 277, 280, 246, 252, 278; 382/300; 358/525

(56) References Cited

U.S. PATENT DOCUMENTS

| | | |
|---|---|---|
| 3,971,065 A | 7/1976 | Bayer |
| 4,595,946 A | 6/1986 | Uehara et al. |
| 4,736,241 A | 4/1988 | Murakami et al. |
| 4,962,419 A | 10/1990 | Hibbard et al. |
| 5,008,739 A | 4/1991 | D'Luna et al. |
| 5,216,493 A | 6/1993 | DiBella et al. |
| 5,373,322 A | 12/1994 | Laroche et al. |
| 5,382,976 A | 1/1995 | Hibbard |
| 5,471,515 A | 11/1995 | Fossum et al. |
| 5,485,202 A | 1/1996 | Ueda |
| 5,530,474 A | 6/1996 | Takei |
| 5,568,195 A | 10/1996 | Suzuki |
| 5,587,596 A | 12/1996 | Chi et al. |
| 5,805,217 A * | 9/1998 | Lu et al. ..................... 348/273 |
| 6,426,773 B1 * | 7/2002 | Suzuki ........................ 348/272 |

* cited by examiner

Primary Examiner—Wendy R. Garber
Assistant Examiner—Matthew C. Rosendale
(74) Attorney, Agent, or Firm—Pillsbury Winthrop LLP (57) ABSTRACT

Described herein are a system and method for reconstructing a color image from sparse image data collected at an imaging sensor which provides intensity data for exactly one color for each pixel location. A pattern for color selection preferably defines an assignment of color information to each pixel location from neighboring pixels. Thus, the color selection pattern provides an assignment of multicolor image data for each pixel location including color information collected at the pixel location in the imaging sensor and color information selected from neighboring pixels according to the color selection pattern. The color selection pattern may be formulated to minimize the effect of color artifacts in the resulting reconstructed image.

40 Claims, 10 Drawing Sheets

Figure 1

| R | G | R | G | R | G | R | G |
|---|---|---|---|---|---|---|---|
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |

Figure 2A

| G | R | G | R | G | R | G | R |
|---|---|---|---|---|---|---|---|
| B | W | B | W | B | W | B | W |
| G | R | G | R | G | R | G | R |
| B | W | B | W | B | W | B | W |
| G | R | G | R | G | R | G | R |
| B | W | B | W | B | W | B | W |
| G | R | G | R | G | R | G | R |
| B | W | B | W | B | W | B | W |

Figure 2B

| Y | C | Y | C | Y | C | Y | C |
|---|---|---|---|---|---|---|---|
| M | W | M | W | M | W | M | W |
| Y | C | Y | C | Y | C | Y | C |
| M | W | M | W | M | W | M | W |
| Y | C | Y | C | Y | C | Y | C |
| M | W | M | W | M | W | M | W |
| Y | C | Y | C | Y | C | Y | C |
| M | W | M | W | M | W | M | W |

| G | B | G | G | B | G |
|---|---|---|---|---|---|
| R | G | G | R | G | G |

| G | G | B | G | G | G |
|---|---|---|---|---|---|
| R | G | G | G | R | G |

COLOR SELECTION FOR SPARSE COLOR IMAGE RECONSTRUCTION

BACKGROUND

1. Field of the Invention

The embodiments described herein relate to image processing techniques. In particular, these embodiments relate to reconstructing a color image from data extracted from an imaging array.

2. Related Art

Because of the tri-stimulus nature of human color perception, in reconstructing a color image of a scene it is typically necessary to recover at least three color components (typically red, green, and blue or cyan, magenta, and yellow) for each picture element (pixel) in the image. Ideally, each photodetector in an imaging device would capture co-aligned red, green, and blue data creating a dense color image. This would eliminate the need for color reconstruction. However, such a system is not feasible due to the required complexity of the photodetectors and the amount of data that would have to be extracted from the imaging device. An alternative approach is to have each photodetector gather data for a single color creating a sparse color image. A known color filter array (CFA) pattern such as a Bayer pattern as described in U.S. Pat. No. 3,971,065 to Bayer applies such an approach.

Single-sensor electronic cameras employing color filter arrays are widely used for the creation of color imagery. In a color filter array of photodetectors such as the aforementioned Bayer pattern array, each photodetector site (pixel) provides information for a single color. For the color image to be of use it is typically converted to a dense color image having data for all three colors at each pixel location. Typically, a fair amount of image processing circuitry is allocated to the task of converting the sparse image to the dense image via elaborate color interpolation schemes. In such schemes the basic assumption that the missing colors at a given pixel are similar to the corresponding detected colors at neighboring pixels. The neighborhood may be defined in a single linear dimension such as 1×3, 1×5, or 1×7 or may be defined in two dimensions such as 3×3 or 5×5. Then, given the neighborhood, interpolation filters combine the pixels within the neighborhood into a single pixel that will be used for the missing color.

When the color similarity assumption does not hold, as is the case at object boundaries, interpolation generally results in one of two situations, or possibly both. First, the images may become blurry. Second, false colors (color artifacts) may be introduced into the image. For objects with elongated boundaries (e.g. long horizontal edges) the artifacts appear as long stripes of artificial color that tends to draw the viewer's attention. This is due to the uniformity in the application of the interpolation filters. These situations are then corrected by performing additional image processing. Blurry images may be sharpened via edge enhancement operations and false colors removed through the use of median or low pass filters.

Another drawback to the interpolation approach is the requirement for algorithmic and associated hardware support adding complexity to the system design. Therefore, there is a need for reducing system complexity for achieving color reconstruction while maintaining adequate color reproduction.

SUMMARY

An object of an embodiment of the present invention is to provide a simplified method for color reconstruction having reduced processing requirements.

Another object of an embodiment of the present invention is to provide a computationally efficient system and method for improving the quality of color images which are reconstructed from data of multiple color channels of an imaging array.

Another object of an embodiment of the present invention is to provide an improved system and method for reconstructing a color image which minimizes the introduction of artifacts.

It is yet another object of an embodiment of the present invention to provide an improved method of constructing a color image from image data extracted from an imaging array.

Briefly, an embodiment of the present invention is directed to a system and method of processing data associated with an array of pixels where each pixel corresponds with one of a plurality of spectral regions and a value representative of an intensity of photoexposure in that spectral region. At each particular pixel location being associated with a corresponding particular one of the plurality of spectral regions, at least one neighboring pixel is selected. The selected neighboring pixel is associated with a spectral region which is distinct from the particular spectral region. Then, the value representative of the intensity of photoexposure associated with the selected pixel is assigned to the particular pixel location as an estimate of an intensity of photoexposure in the distinct spectral region at the particular pixel location.

By assigning to each pixel location color information extracted from adjacent pixel locations, the processing requirements of color reconstruction remain modest. By properly selecting particular neighboring pixels for providing the missing color information, color artifacts can be minimized at object boundaries in the original scene.

DETAILED DESCRIPTION

Embodiments of the present invention are directed to a system and method for reconstructing a color image from sparse image data collected at an imaging array which provides intensity data for exactly one color for each pixel location. A pattern for color selection preferably defines an assignment of color information to each pixel location from neighboring pixels. Thus, embodiments of the present invention provide multicolor image data for each pixel location, including, color information collected at the pixel location and color information selected from neighboring pixels according to the color selection pattern. The color selection pattern is also preferably formulated to minimize the effects of color artifacts.

Figure 1:
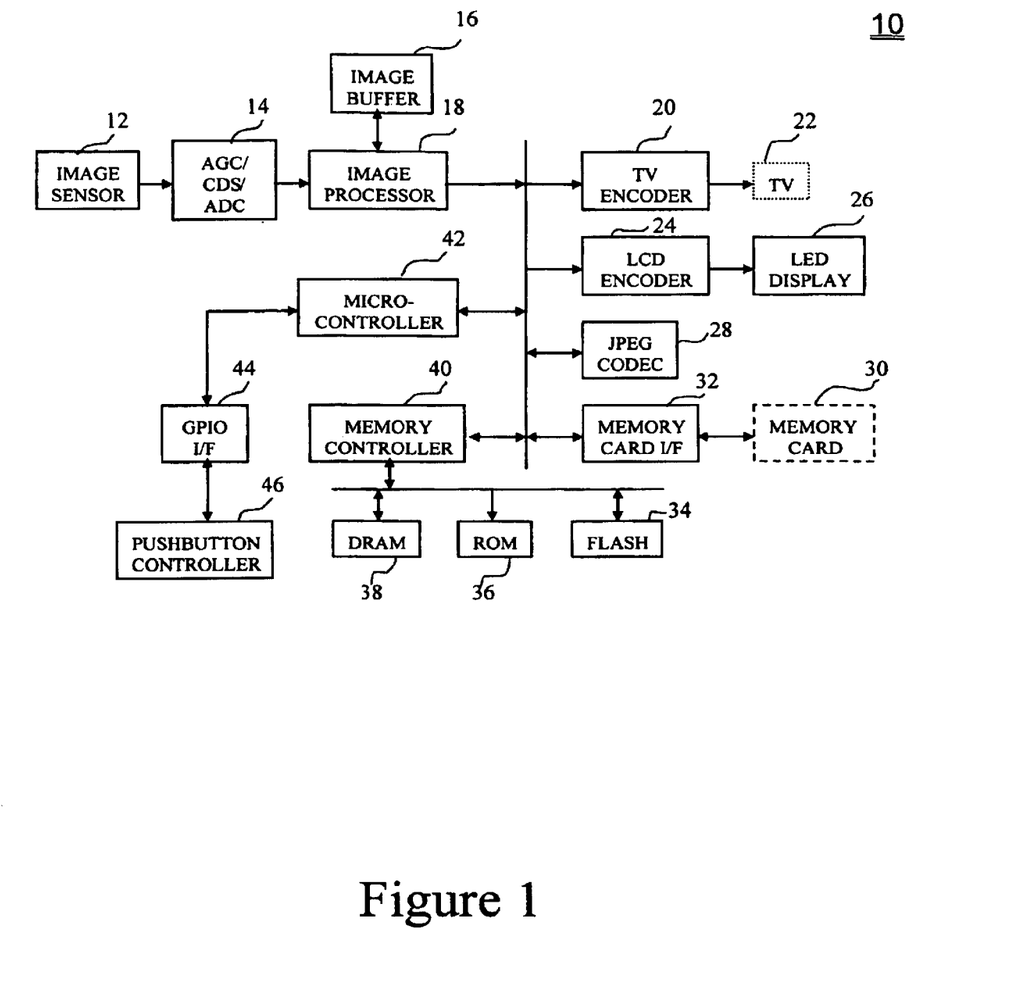
FIG. 1 shows a schematic block diagram of an electronic camera system according to an embodiment.

FIG. 1 shows a block diagram for an electronic camera system according to an embodiment. An imaging sensor 12 is preferably an electronic sensor which receives an image focused thereon by an optical system (not shown). The imaging sensor 12 may include a semiconductor substrate with transmissive filters deposited over selected locations to form pixels. Each pixel is sensitive to photoexposure in a particular spectral region defined by the transmissive properties of the transmissive filter deposited over the associated pixel location. The semiconductor substrate includes circuitry for extracting data which is representative of an intensity of photoexposure of particular pixel elements over an exposure period. The semiconductor substrate may be formed as a charge couple device (CCD) or an active pixel sensor (APS) as described in U.S. Pat. Nos. 5,471,515 and 5,587,596.

Circuitry at section 14 performs functions for automatic gain control, correlated double sampling and analog-to-digital conversion functions to provide digital data representative of the intensity of the photoexposure of pixel elements at specific locations on the imaging sensor 12. For embodiments in which the imaging sensor 12 is of an APS design, the intensity values representative of the photoexposure of the pixel elements in the array may be extracted using pixel readout circuitry described in U.S. patent application Ser. No. 09/274,424, entitled "Pixel Read-Out Architecture," filed on Mar. 22, 1999, assigned to Biomorphic VLSI, Inc., and incorporated herein by reference.

An image processor 18 receives raw digital sensor data captured at the imaging sensor 12 and transforms the raw digital sensor data into a full color image. For color image data defining three colors at each pixel location and representing the pixel intensity value for each color at that pixel location with one eight bit value, each pixel location is associated with 24 bits of data to define the intensity values at each of the three spectral regions associated with the respective three colors in the image. Other embodiments may represent pixel intensity values with ten, twelve or more bits with an associated multiple of bits representing the total color information at the pixel location. Thus, for a three-color image, the image processor 18 preferably provides three overlapping arrays or sub-images of pixel data, each array containing all of the pixel intensity values for an associated color channel.

FIG. 1 depicts the image sensor 12, circuitry at section 14 and image processor 18 as separate functions. In one embodiment, these functions may be performed by three corresponding separate integrated circuits. In other embodiments, the image sensor 12, circuitry at section 14 and image processor 18 may be integrated into the same semiconductor substrate. In other embodiments, portions of the functionality of the image processor 18 may be formed in the same semiconductor substrate as the image sensor 12 and the circuitry at section 14 while other portions of the functionality may be formed in a separate semiconductor substrate.

As discussed below with reference to FIG. 3, the image processor 18 executes several processes for transforming the raw digital sensor data into a full color image. According to an embodiment, the image processor 18 reads from and writes to an image buffer 16 during intermediate computations and manipulations of the image data. The image processor 18 may execute the processes for transforming the raw digital sensor data by any one of several commercially available programmable RISC processors or digital signal processors. Alternatively, the image processor 18 may have an application specific integrated circuit (ASIC) design.

A JPEG codec 28 may provide data compression. Instructions executed by a microcontroller 42 may be stored in a read-only memory (ROM) 36. DRAM 38 or flash memory 34 may store data representative of images processed at the image processor 18. A memory card 30 may then store finished images, serving as an electronic "film," through a memory card interface block 32. An LCD display 26 provides a view finder while a photographer is taking pictures. A serial interface such as an RS-232 serial port or a universal serial bus (USB) (not shown) may couple the electronic camera system 10 to a personal computer system. A television encoder 20 may also couple the electronic camera system 10 to a television set 22.

Figure 2A:
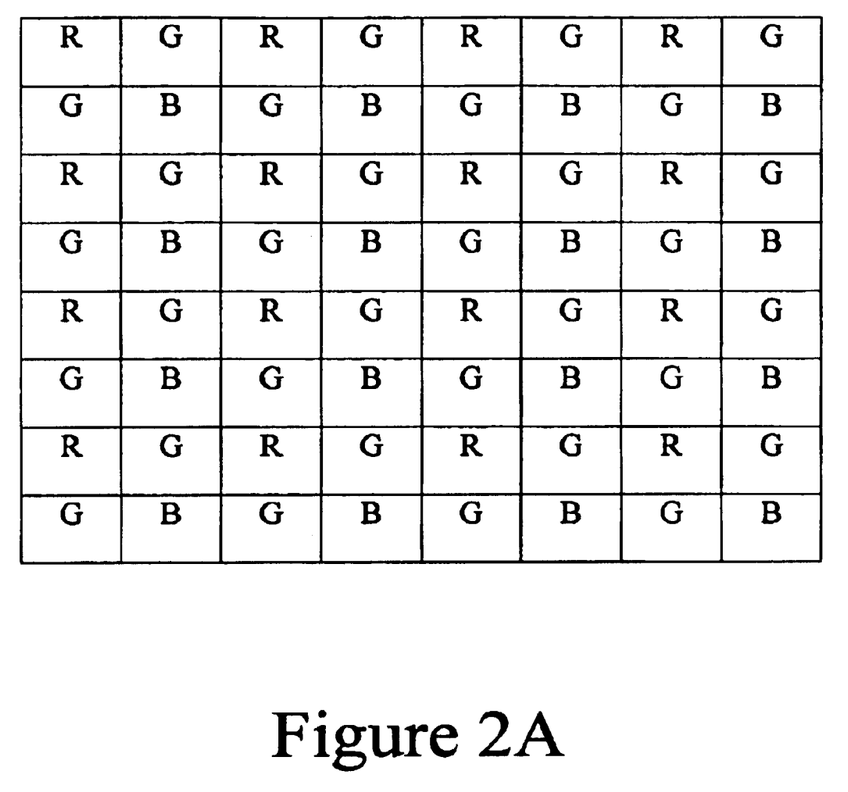
FIGS. 2A, 2B and 2C show embodiments of the imaging sensor shown in the embodiment of FIG. 1

FIG. 2A shows an embodiment of the imaging sensor 12 which includes pixels for extracting color information in distinct red, green and blue spectral regions. The letters R, G and B represent locations of red, green and blue pixels, respectively. As pointed out above, pixels may be formed by depositing a transmissive filter over specific pixel locations as described in detail in U.S. patent application Ser. No. 09/274,413, entitled "Color Filter Pattern," filed on Mar. 22, 1999, assigned to Biomorphic VLSI, Inc., incorporated herein by reference. The color pattern of pixels distributed over the imaging sensor 12 is shown as having a typical Bayer pattern which is described in U.S. Pat. No. 3,971,065.

Figure 2B:
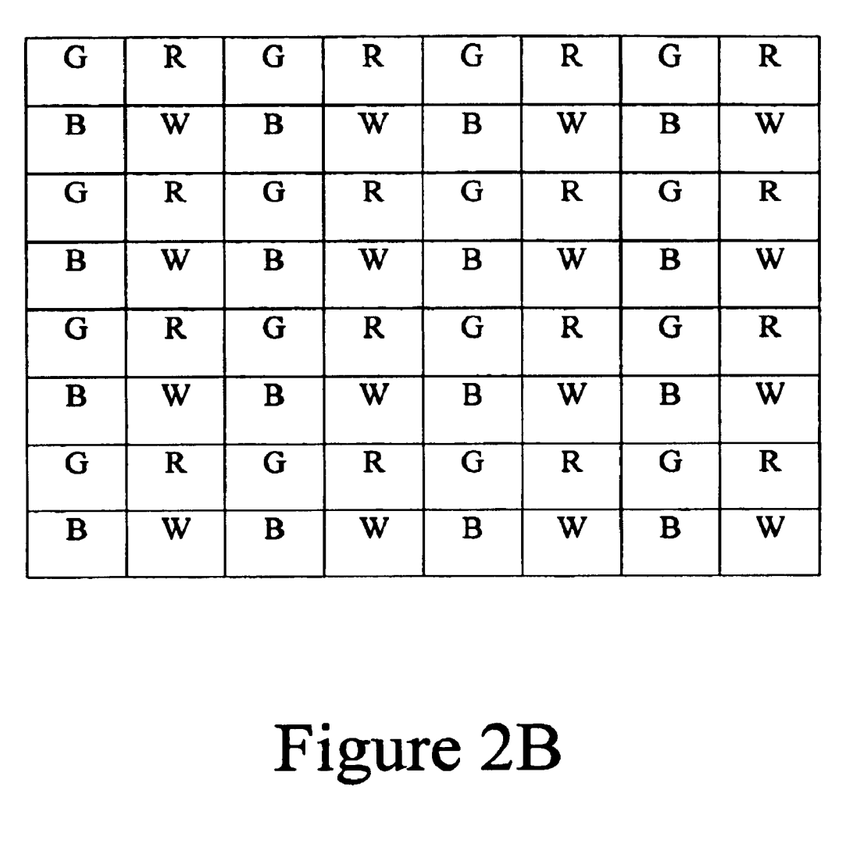
Figure 2C:
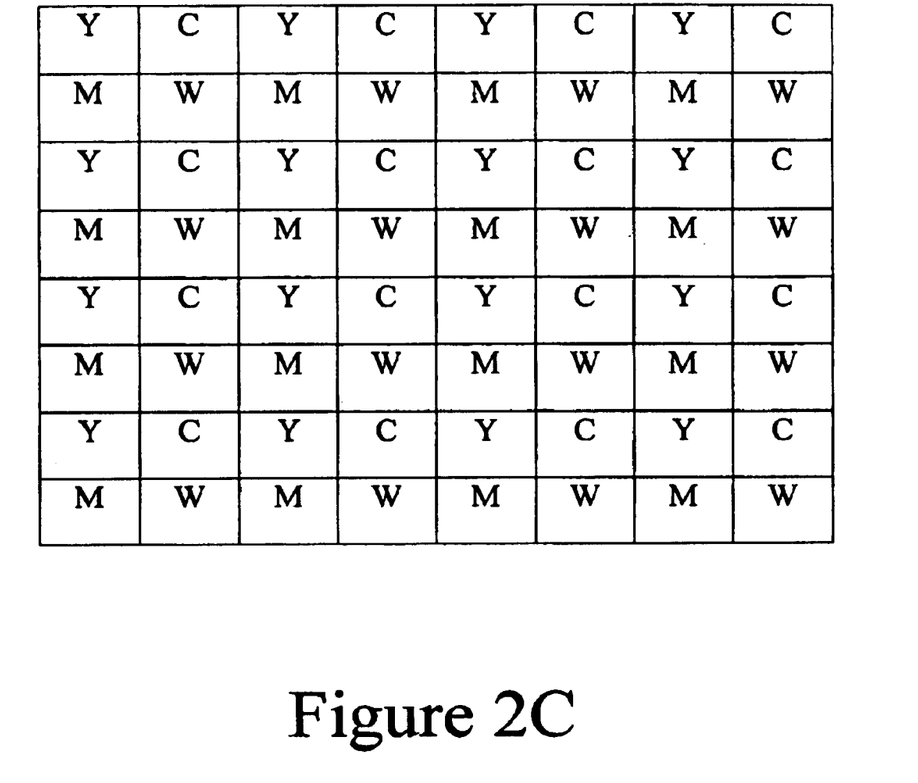

FIG. 2B shows an alternative embodiment of the imaging sensor 12 with a color pattern for extracting color interaction in distinct red, green, blue and white spectral regions. The letters R, G, B and W represent locations of red, green, blue and white pixels, respectively. As discussed in the aforementioned U.S. patent application Ser. No. 09/274,413, the white pixels may be formed in a semiconductor imaging device by maintaining an absence of a transmissive filter deposited over white pixel locations while associated transmissive filters are deposited over the red, green and blue pixel locations. FIG. 2C shows an additional embodiment of the imaging sensor 12 with a four color filter pattern for extracting color information in the cyan, magenta, yellow and white distinct spectral regions. The letters C, M, Y and W represent locations of cyan, magenta, yellow and white pixels, respectively.

Figure 3:
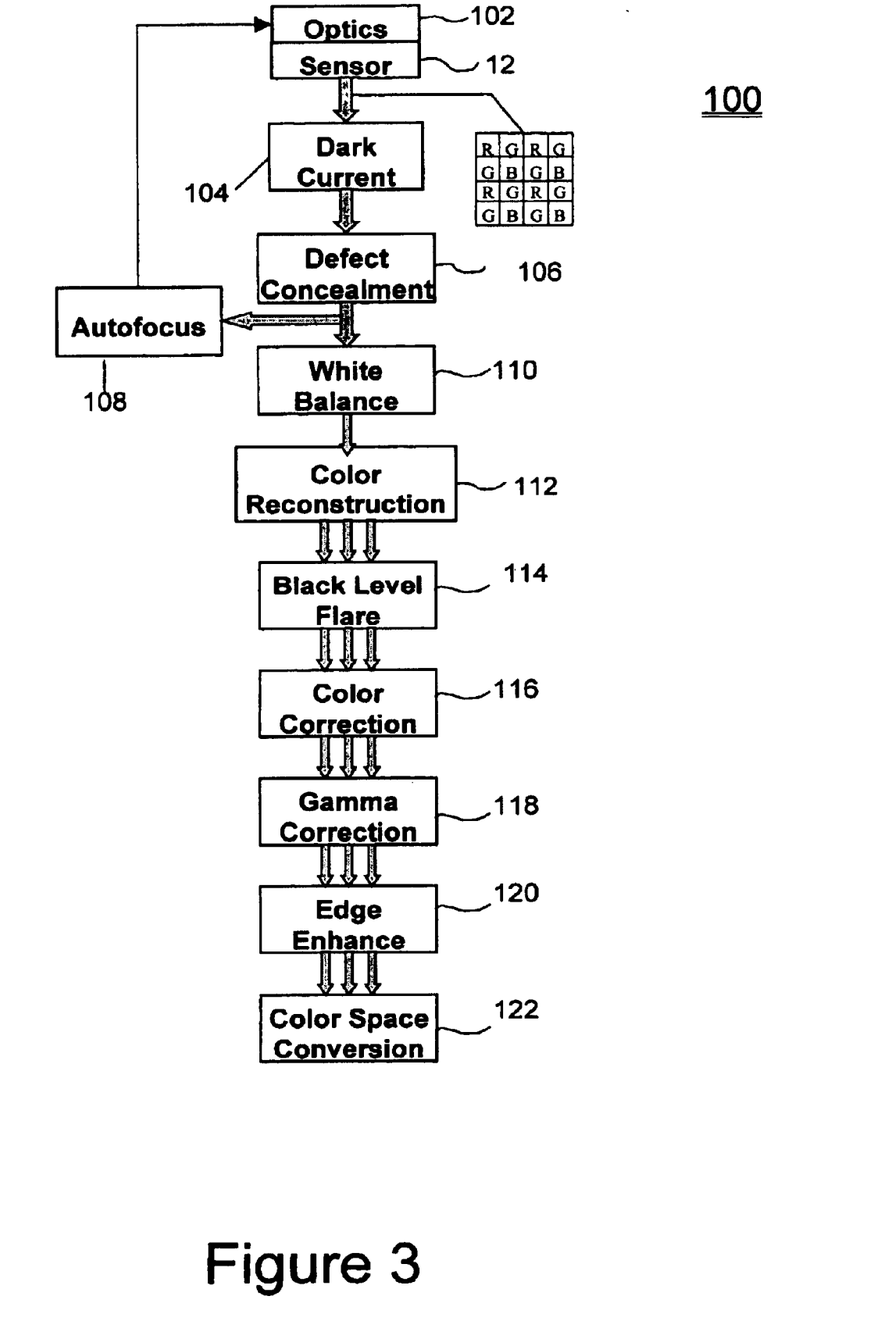
FIG. 3 is a functional flow diagram illustrating processes executed at the image processor shown in FIG. 1 according to an embodiment.

FIG. 3 illustrates a process for providing finished color images from raw digital sensor data. Steps 110 through 122 are preferably executed at the image processor 18 (FIG. 1). According to an embodiment, the image processor 18 performs the steps 110 through 122 with logic circuitry formed in an ASIC (e.g., when the image processor 18 is formed in the same semiconductor substrate as the circuitry at section 14 and the image sensor 12). Such logic circuitry may be formed in an ASIC using Verilog or VHDL tools. In other embodiments, the image processor 18 performs the steps 110 through 112 by executing algorithms encoded into computer readable instructions. The image processor 18 may retrieve the computer readable instructions from the ROM 36 or DRAM 38 or the computer readable instructions may be stored in a programmable ROM (not shown) which is a part of the image processor 18. In other embodiments, the image processor 18 may retrieve the computer readable instructions from a peripheral memory device such as the flash 34, a hard disk drive (not shown) or a floppy disk drive (not shown).

A dark current correction section 104 subtracts dark current components in the raw sensor data received from the imaging sensor 12. Invariably, some of the pixels in the imaging sensor 12 may be defective. A defect concealment section 106 compensates for these defects by, for example, interpolating from neighboring pixels of the same color or replacing the data from the defective pixel with that of the nearest neighboring non-defective pixel of the same color. A defect map is preferably stored in a memory (such as the image buffer 16) to maintain a record of each defective pixel in the imaging sensor 12.

FIG. 3 illustrates a process of white balancing at step 110 followed by a process of color reconstruction at step 112. White balancing at the step 110 includes the calculation of gain coefficients to be applied to the pixel intensity data from each of the color channels to correct for unbalanced color information in the image data resulting from, among other things, unbalanced ambient lighting. Techniques for white balancing are known to those of ordinary skill in the art as discussed in U.S. Pat. Nos. 5,530,474; 5,485,202; 5,216,493; 4,736,241 and 4,595,946.

Embodiments of the imaging sensor 12 illustrated in the above mentioned U.S. patent application Ser. No. 09/274,413 receive color intensity information at each pixel location data for a distinct color or spectral region. Therefore, at any particular pixel location color information is collected for a single color. Color information for the other color channels is not collected at the particular pixel location. The process of color reconstruction at step 112 provides pixel intensity value for each of the color channels at each pixel location. This may be performed by a process of color selection whereby the imaging sensor 12 provides color information for one particular color channel at a particular pixel location, and color data extracted at neighboring pixel locations provides the color information for the other color channels as described below with reference to specific embodiments. Alternatively, step 112 may perform a color reconstruction process to provide image data for all colors at a pixel location as described in U.S. patent application Ser. No. 09/482,844, entitled "Continuity Condition in Color Interpolation," filed concurrently herewith, assigned to Biomorphic VLSI, Inc., and incorporated herein by reference. The color reconstruction step 112 preferably provides a component sub-image for each color channel. For example, in reconstructing color image data from the imaging sensor in FIG. 2A, having red, green and blue color channels, the color reconstruction step 112 provides three corresponding component sub-images. In reconstructing color image data from the imaging sensors illustrated in FIGS. 2B and 2C, each having four color channels, the color reconstruction step 112 provides four corresponding component sub-images.

At step 114, the image processor 18 performs black level flare processing to remove any bias in the intensity values resulting from, for an example, an overexposure due to camera flash. Such black level flare processing may be performed using algorithms which are well known in the art. Each pixel of a particular color or spectral region may also be responsive to photon energy which is outside of the spectral region associated with the pixel, introducing a color error. At step 116, the image processor 18 performs color correction to account for any such errors in the pixel data.

The image processor 18 may then perform a gamma correction process at step 118 which compensates for non-linearities in display devices. Here, the image data may be adjusted for a display onto a CRT device such as a television screen or computer monitor using a standard gamma of 2.2, as specified in the ITU-RBT.709 standard.

The processes of color reconstruction at step 112 may blur certain edges in the image. Step 120 preferably enhances edges in the image which may have been blurred in the color interpolation.

Finally the image processor 18 converts the color channels of the digital image, red, green and blue, for example, to a different color space such as YcbCr color space. The embodiment of FIG. 3 shows the process of white balancing at step 110 occurring prior to the process of color reconstruction at step 112. Here, the white balancing process at step 110 provides image data of a single color at each pixel location corresponding with the arrangement of pixel colors on the imaging sensor 12. The process of color reconstruction then converts this image data into data representative of multiple overlapping sub-images corresponding to the number of different colors of pixels on the imaging sensor 12. Each of these sub-images includes data representative of pixel intensity at each location in the sub-image for a color or spectral region associated with the sub-image. Thus, in the embodiment of the imaging sensor 12 as shown in FIG. 2A, the color reconstruction process at step 112 will provide data representative of three sub-images corresponding to red, green and blue. Similarly, the color reconstruction process 112 will preferably provide a fourth sub-image corresponding to white for the embodiment of the imaging sensor 12 as shown in FIG. 2B, and provide four sub-images corresponding to cyan, magenta, yellow and white for the embodiment of the imaging sensor 12 as shown in FIG. 2C.

In an alternative embodiment, the process of color interpolation may precede the process of white balancing. Here, immediately following the process of defect concealment at step 106, the color interpolation process converts the image data with pixel data for a single color at each pixel location into multiple overlapping sub-images. The process of white balancing is then performed over the data representative of all of the sub-images provided by the color interpolation process.

Figure 4:
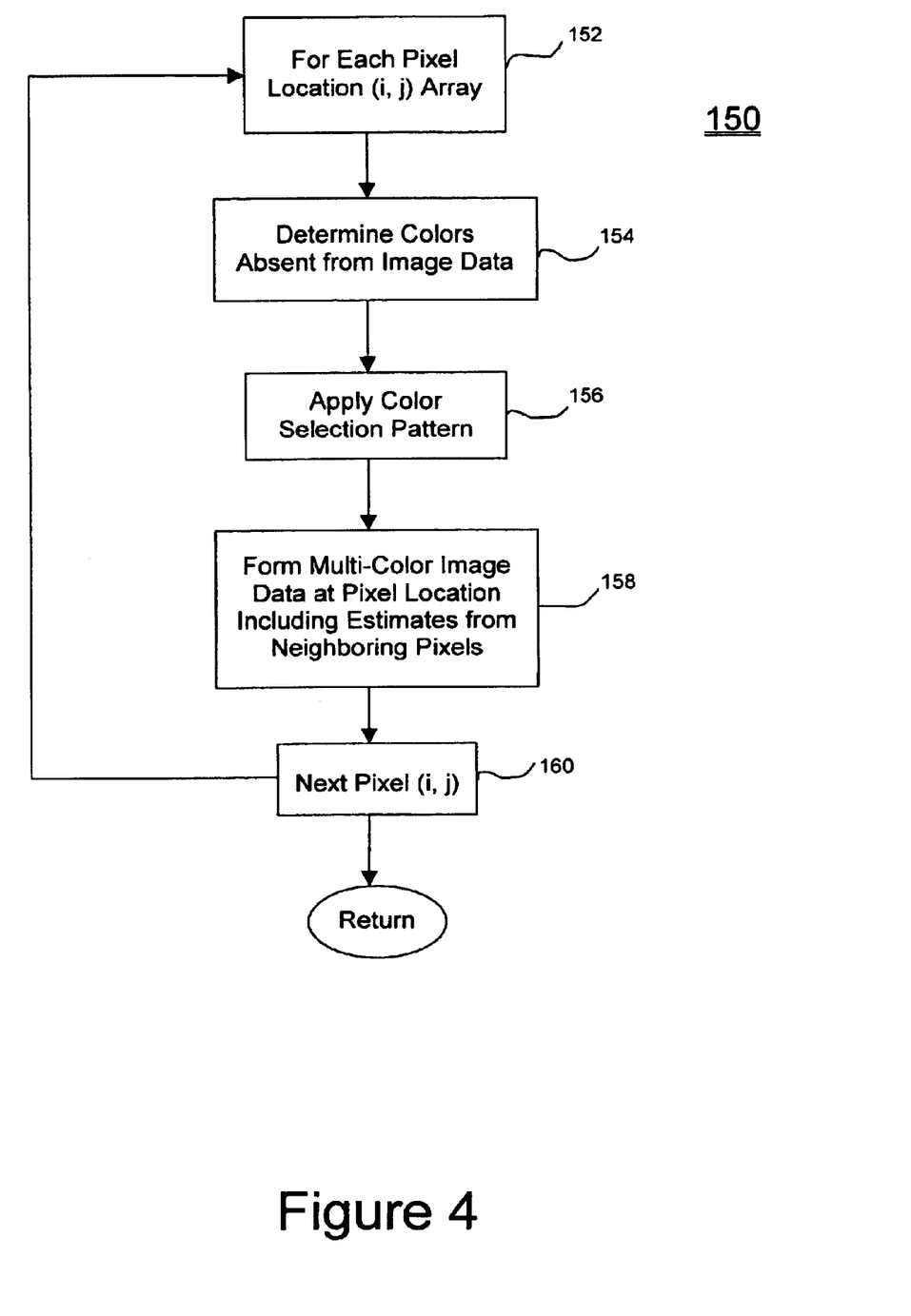
FIG. 4 is a functional flow diagram illustrating an embodiment of the color reconstruction process in the embodiment of FIG. 3.

Embodiments of the present invention are directed to a system and method for performing the color reconstruction process at step 112 as shown in the embodiment of FIG. 3 and, in an alternative embodiment, performing color reconstruction prior to white balancing at step 110. FIG. 4 shows a functional flow diagram illustrating an embodiment of the color reconstruction performed at step 112. This step processes an array of pixel data having for each pixel location in the imaging sensor 12 a color intensity value for exactly one color (e.g. red, green or blue). For example, in the embodiment directed to processing data from a sensor having a Bayer pattern (as shown in FIG. 2A), this process receives an array of data having a single color intensity value representative of an intensity of photoexposure of either red, green or blue at each pixel location. According to an embodiment shown in FIG. 4, single color image data from each pixel is sequentially processed to provide multicolor image data at each pixel location, one pixel at a time in a serial fashion. However, it is understood that the order of processing each of the pixels does not affect the end result and other methods including parallel processing can be employed.

Steps 152 through 158 may determine multicolor image data for a pixel location (i, j) in the imaging array from color image data stored in a memory associated with the image processor 18. In this embodiment, this color image data includes a single digital value representative of an intensity of photoexposure at each pixel location in the imaging sensor 12 corresponding to one of the color channels. Those digital values are preferably retrieved from a memory accessible by the image processor 18. In other embodiments, steps 152 through 158 process image data in a streamed fashion by, for example, processing the image in sets of pixel lines or as a processing stage in a pipeline process.

Step 154 determines which colors are absent from the image data at the pixel location (i, j). For image data received from a Bayer pattern array, for example, if pixel location (i, j) is associated with photoexposure in the green spectral region, step 154 determines that the pixel location requires image data for the red and blue spectral regions. Similarly, if the image data associated with the pixel location (i, j) is associated with photoexposure in the red spectral region, step 154 determines that the pixel location requires image data for the green and blue spectral regions which are absent. Likewise, if the image data the pixel location (i, j) is representative of photoexposure in the blue spectral region, step 154 determines that the pixel location requires image data for the green and red spectral regions which are absent.

Upon determining the image data absent from the pixel location (i, j), step 156 applies a selection pattern which associates the pixel location (i, j) with specific neighboring pixels. The image data from these neighboring pixels is preferably representative of photoexposure in the spectral regions which were not collected on the imaging sensor 12 at the pixel location (i, j). Step 158 preferably forms multicolor image data for the pixel location (i, j) to be stored in memory associated with the image processor 18. Upon processing all pixels in the image (i.e., forming multicolor image data for all pixel locations in the image), step 158 provides a digital representation of a sub-image for each color channel.

Figure 5:
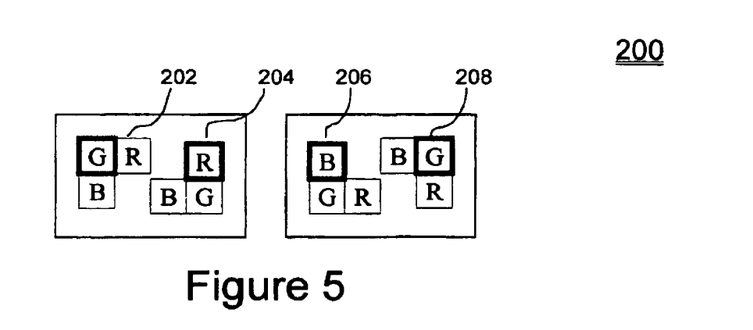
FIG. 5 illustrates color selection assignment patterns according to an embodiment.

FIGS. 5 through 9 illustrate embodiments of specific color selection patterns which are employed at step 156 of the color selection process. FIG. 5 illustrates a color selection pattern applicable to image data from a Bayer pattern imaging array. Patterns 202 through 208 show how intensity values from neighboring pixel elements are assigned to the pixel element which is outlined in bold. As illustrated above in FIG. 2A, each row in the imaging array has alternating red and green pixels or alternating green and blue pixels. Pattern 202 represents the color selection process for green pixel locations in rows of alternating green and red pixels while pattern 208 represents the color selection process for green pixels in the rows of alternating blue and green pixels. In each of these patterns 202 and 208, the green pixel which is outlined in bold is assigned the values representative of the photoexposure in the neighboring blue and red pixels to provide multicolored image data at the outlined green pixel location. Pattern 204 illustrates the selection pattern for each red pixel. Here, intensity values of neighboring blue and green pixels are assigned to the pixel location of the red pixel to provide multicolor image data at that red pixel location. Similarly, pattern 206 represents the color selection process for each blue pixel in which the intensity values of neighboring green and red pixels are assigned to the location of the blue pixel to provide multicolor image data at that blue pixel location.

Figure 6:
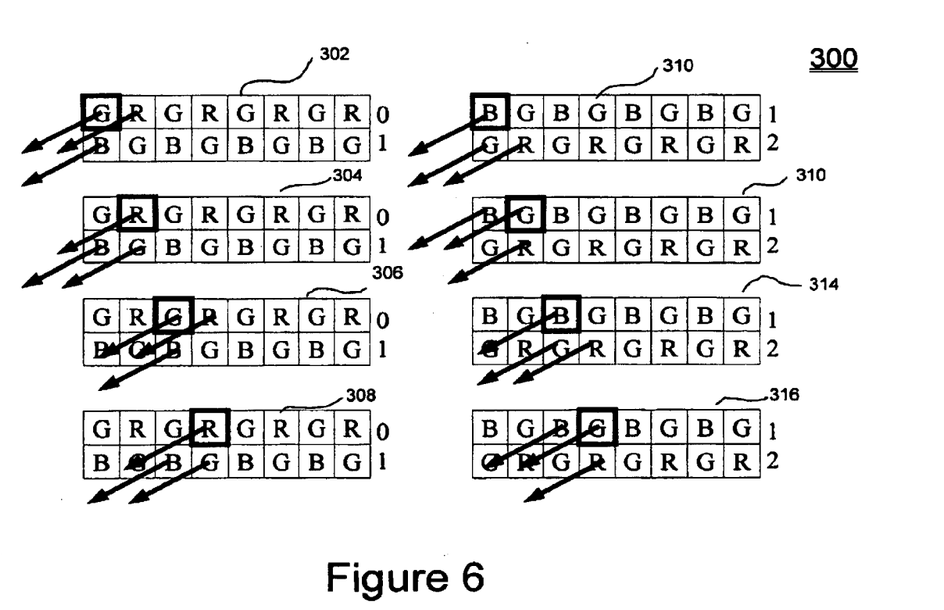
FIG. 6 illustrates the color selection process on a row by row basis according to the embodiment of FIG. 5.

FIG. 6 illustrates how the color selection patterns of FIG. 5 are applied to rows of alternating red and green pixels and rows of alternating green and blue pixels. In this scheme, the patterns of FIG. 5 are applied over the entire image to select color values of a given pixel's nearest neighbors by merely copying the selected color values onto missing colors for that given pixel's location in the imaging sensor 12. The letter in each box represents the color detected by the associated photodetector at that site (R, G, B) in the imaging sensor 12. Again, the bold outline block indicates the pixel location corresponding to the photodetector site which receives image data from neighboring pixel locations, and the arrows projecting from the blocks indicate the three photodetector sites which will provide image data to make up the color image data at the pixel location of the bold outline block.

FIG. 6 shows the pattern for filling image data for the first four sites in the first three rows of detectors. The pattern repeats itself until there is image data for all 3 colors at each pixel location. In the schemes illustrated in FIGS. 5 and 6, the pixel location for each green pixel is assigned red and blue pixel values, one value from a pixel in the same row as the green pixel and another value from a pixel in an adjacent row. For each of the red and blue pixel locations, a green pixel value and either a red or blue pixel value are selected from an adjacent row.

Figure 7:
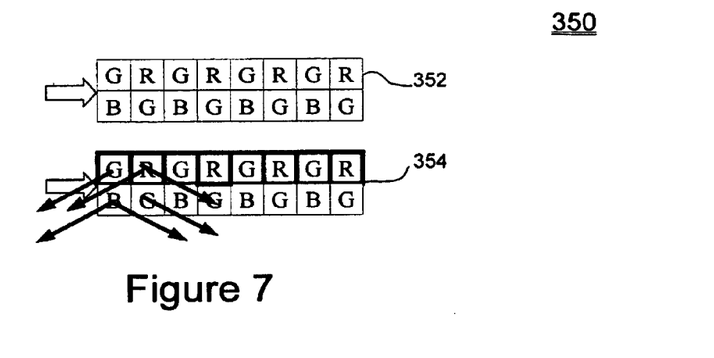
FIG. 7 illustrates color artifacts which may result in the embodiments illustrated in FIGS. 5 and 6.

While the embodiments illustrated with reference to FIGS. 5 and 6 provide a consistent and simple pattern for providing multicolor image data at each pixel location (from an array of pixel data initially providing only data for one color at each location), such a scheme may introduce color artifacts in the resulting image. These artifacts may appear along horizontal and vertical object boundaries. In an example, FIG. 7 illustrates artifacts which are caused along a horizontal border. The outlined arrow at the left of pixel rows 352 identifies the location of a horizontal object boundary in the original scene. Since all of the pixel sites above the boundary line will be assigned colors from pixels below the boundary, and all of the pixels below the boundary will be assigned colors from above the boundary, each of the two regions separated by the horizontal object boundary will contain color components assigned from the other region. This may have a tendency to create a solid line of false color which is noticeable by the viewer.

Figure 8:
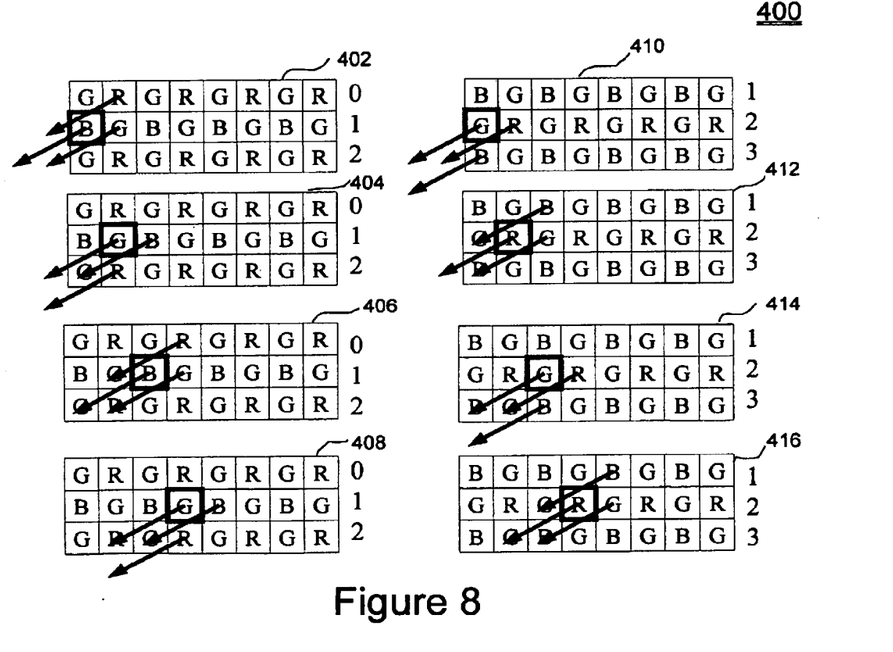
FIG. 8 illustrates an embodiment of the color selection process in which dithering is employed to reduce the incidence of color artifacts at object boundaries.

FIG. 8 illustrates an alternative embodiment implementing a color selection pattern assigning the pixels in a given row color image data from alternate adjacent rows. For example, the sets of pixel rows 402, 404, 406 and 408 illustrate color selection at row 1 which includes alternating blue and green pixels. At set of pixel rows 402, the location of the outlined blue pixel is assigned color image data from a red pixel in adjacent row 0 and from an adjacent green pixel in row 1. At set of pixel rows 404, a green pixel in row 1 is assigned color image data from a red pixel in an alternate adjacent row 2 and from an adjacent blue pixel in row 1. The color selection patterns illustrated in sets of pixel rows 402 and 404 are repeated in sets of pixel rows 406 and 408.

Sets of pixel rows 410, 412, 414 and 416 illustrate color selection for alternating green and red pixels in row 2. At set of rows 410, a green pixel location is assigned color image data from a blue pixel in an adjacent row 3 and from an adjacent red pixel in row 2. In set of rows 412, a red pixel is assigned color image data from an adjacent green pixel in row 2 and from a blue pixel in an alternate adjacent row 1. This pattern is repeated in rows 414 and 416.

Figure 9:
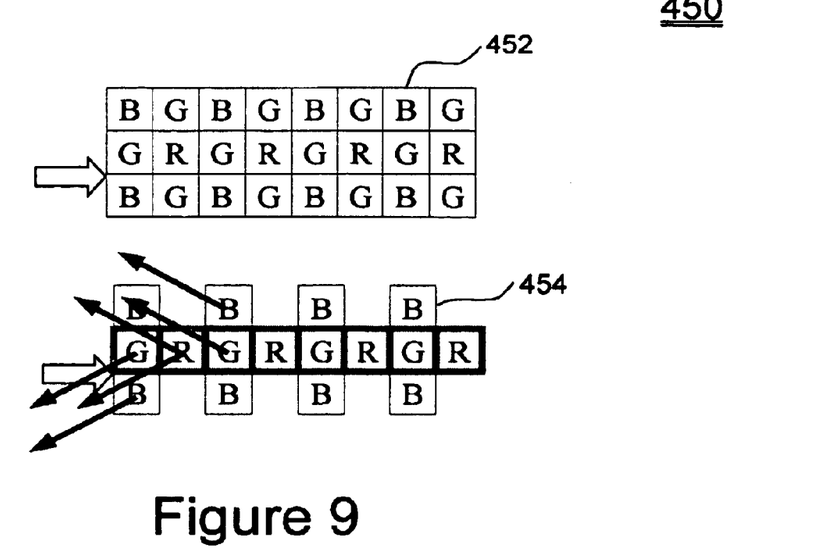
FIG. 9 illustrates the reduction of color artifacts in the embodiment according to FIG. 8.

FIG. 8 illustrates that red color information is assigned to row 1 from alternating adjacent rows 0 and 2. Similarly, sets of rows 410 through 416 illustrate that row 2 receives color image data from blue pixels in alternating rows 1 and 3. This color selection pattern has a tendency of breaking up color artifacts into smaller segments which are less noticeable in the final image. FIG. 9 illustrates this phenomenon for the assignment of blue color data to a row of alternating green and red pixels. Here, the outlined arrow to the left of the set of rows 452 identifies a horizontal object boundary separating objects in the original scene. Alternate selection of colors from above the horizontal object boundary and below the horizontal object boundary will reduce the incidence of color artifacts. Combined with the accurate color selections from pixels above and below the horizontal object boundary, these color artifacts are made less noticeable.

Figure 10:
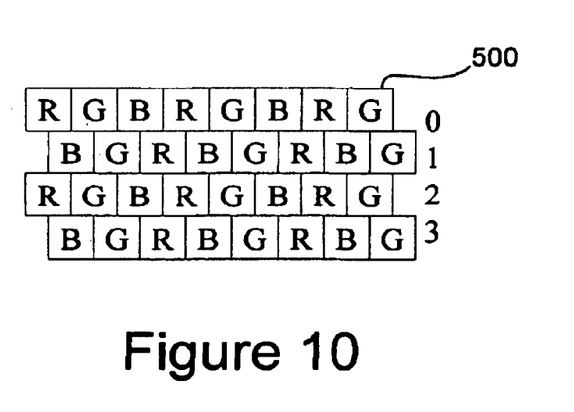
FIG. 10 illustrates an embodiment of a non-Cartesian imaging array which may be used in conjunction with a color selection process to reduce color artifacts.

FIG. 10 illustrates an embodiment of an imaging array 500 which may reduce the incidence of color artifacts in a color selection process. Adjacent rows are staggered by one-half of a pixel width. That is, adjacent pixels in each row are separated by a pixel boundary. Each pixel in each row is centered about a pixel boundary in an adjacent row to thereby stagger adjacent pixels by one-half of a pixel width. Such a layout of pixel elements in the imaging array reduces the distance between the centers of neighboring pixel sites, and staggers the selection pattern to increase the probability that the neighboring sites containing colors that arise from the same object. In an embodiment in which the imaging array 500 is of an APS design, photodiodes are formed in a semiconductor substrate in a staggered fashion consistent with the illustrated layout. Appropriate red, green and blue transmissive filters are then deposited over the staggered photodiode sites to provide the illustrated imaging array 500. Also, it should be understood that using an imaging array such as that shown in FIG. 10 may require an additional conversion following the color reconstruction step 112 (FIG. 3) to provide color image data on a Cartesian grid for display on a standard computer or television monitor. Such a conversion may include, among other things, interpolation between neighboring pixel sites on the array 500.

Figure 11:
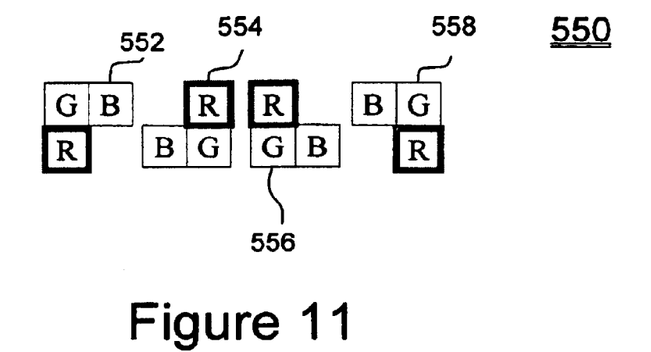
FIG. 11 illustrates an alternate color selection assignment pattern according to an embodiment.
Figure 12:
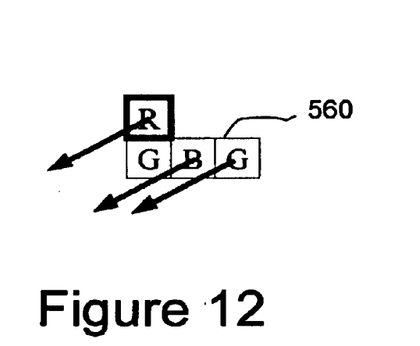
FIG. 12 illustrates an alternate color selection assignment pattern according to an embodiment.
Figure 13:
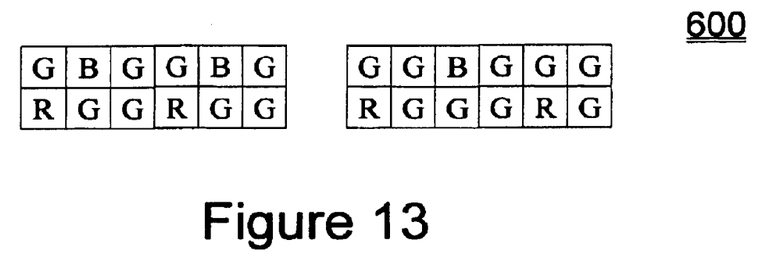
FIG. 13 illustrates an alternate color filter pattern for an imaging array which may be used with a color selection process to reduce color artifacts.

FIG. 11 illustrates an embodiment of a selection pattern in which red pixels are assigned color image data from green and blue pixels in an adjacent row. In a similar fashion, blue pixels may be assigned color image data from green and red from pixels in an adjacent row. While it is desirable for many applications to assign color image data from adjacent pixels, other applications may benefit from selection patterns that are not direct neighbors as illustrated in FIG. 12. Accordingly, embodiments of the present invention are not limited to any particular selection pattern, but rather, embodiments of the present invention are generally directed to providing multicolor image data corresponding each pixel location (in an imaging array which extracts data for a single color at the pixel location) by assigning data representative of different colors from neighboring pixel locations. Also, embodiments of the present invention are not limited to processing color image data from any particular pattern of imaging device. While the above-described embodiments are directed to a color selection process for color image data extracted from a Bayer pattern imaging sensor, embodiments of the color selection scheme may be applied to processing image data from imaging sensors having other color patterns such as those illustrated in FIGS. 10 and 13.

Additionally, embodiments of the present invention are not necessarily limited to processing image data from imaging sensors which provide image data in only three colors of spectral regions. For example, the above-described color selection methods may be applied to reconstructing a color image from image data provided by the imaging array shown in FIG. 2B having pixels which are sensitive to photoexposure in four spectral regions: red; blue; green and white. These methods may also be applied to reconstructing color image data from the imaging sensor shown in FIG. 2C having pixels which are sensitive to photoexposure in cyan, magenta, yellow and white spectral regions. Such embodiments directed to reconstructing images from pixels of four distinct spectral regions (e.g., reconstructing a color image from image data received at the imaging sensors illustrated in FIGS. 2B and 2C) involves assigning to each pixel location color image data from three neighboring pixel locations to provide color image data for the four spectral regions at each pixel location in the reconstructed image.

The above-discussed color selection schemes are described as a serial process of assigning color information one pixel at a time, one row at a time. In particular, these patterns are described as a color selection process which occurs from left to right in a serial fashion, applying the selection patterns to each pixel in a row, one pixel at a time. Embodiments of color selection may also be performed one pixel at a time from right to left in each row, top to bottom in each column or bottom to top in each column. Additionally, the above-described color selection schemes may also apply to data arrays that are processed simultaneously or in parallel readouts. The above-described color selection schemes operate independently of how the image data is read out from the sensor from a sequence in which pixels associated with a single color are assigned color image data from neighboring pixels.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method of processing data associated with an array of pixels, each pixel corresponding with one of a plurality of distinct spectral regions and being associated with a value representative of an intensity of photoexposure at a pixel location in the array, the method comprising:
   capturing a single image in exactly one photoexposure period using the array of pixels;
   at each pixel location being associated with a corresponding one of the plurality of spectral regions, selecting at least one neighboring pixel being associated with a spectral region which is distinct from the corresponding spectral region; and
   assigning the value representative of the intensity of photoexposure associated with the selected neighboring pixel to the pixel location, the assigned value being an estimate of an intensity of photoexposure in the distinct spectral region at the pixel location.

2. The method of claim 1, the method further comprising selecting the at least one neighboring pixel based upon a directional location of the neighboring pixel relative to the pixel location.

3. The method of claim 1, the method further including:
   for each pixel location associated with a corresponding one of the plurality of spectral regions, selecting neighboring pixels being associated with each of the plurality of spectral regions which is distinct from the corresponding spectral region; and
   assigning to the pixel location the values representative of the intensity of photoexposure associated with the neighboring pixel for each spectral region which is distinct from the corresponding spectral region, each of the assigned values being representative of an estimate of an intensity of photoexposure in the distinct spectral region at the pixel location,
   wherein the values representative of the actual intensity photoexposure in the spectral regions at the pixel locations in the imaging array and the estimates of the intensity of photoexposure in the distinct spectral regions provide data representative of a color image having a value representative of an intensity of photoexposure in each of the spectral regions at each pixel location.

4. The method of claim 1, wherein the imaging array includes alternating odd and even rows of pixels, each of the odd rows having alternating pixels associated with values representative of photoexposure in a first spectral region and a second spectral region, each of the even rows having alternating pixels responsive to the first spectral region and a third spectral region, each of the odd rows being adjacent to an even row and each of the even rows being adjacent to an odd row, the method further including:

at each pixel location associated with the first spectral region in each of the odd rows, assigning a value representative of the intensity of photoexposure in the second spectral region from an adjacent pixel in the odd row and assigning a value representative of the intensity of photoexposure in the third spectral region from a pixel in an adjacent even row;

at each pixel location associated with the first spectral region in each of the even rows, assigning a value representative of the intensity of photoexposure in the third spectral region from an adjacent pixel in the even row and assigning a value representative of the intensity of photoexposure in the second spectral region from a pixel in an adjacent odd row;

at each pixel location associated with the second spectral region in each of the odd rows, assigning a value representative of the intensity of photoexposure in the first spectral region from a pixel in a first adjacent even row and assigning a value representative of the intensity of photoexposure in the third spectral region from a pixel in a second adjacent even row; and at each pixel location associated with the third spectral region in each of the even rows, assigning a value representative of the intensity of photoexposure in the first spectral region from a pixel in a first adjacent odd row and assigning a value representative of the intensity of photoexposure in the second spectral region from a pixel in a first adjacent odd row.

5. The method of claim 4, wherein the first and second adjacent odd rows are the same row and the first and second even rows are the same row.

6. The method of claim 4, wherein the first and second adjacent odd rows are separated by an even row and the first and second adjacent even rows are separated by an odd row.

7. The method of claim 1, wherein the imaging array includes alternating odd and even rows of pixels, each of the odd rows having alternating pixels associate with values representative of photoexposure in a first spectral region and a second spectral region, each of the even rows having alternating pixels responsive to the first region and a third spectral region, each of the odd rows being adjacent to an even row and each of the even rows being adjacent to an odd row, the method further including:

at each odd row, at each pixel location associated with the first spectral region assigning a value representative of the intensity of photoexposure in the second spectral region from an adjacent pixel in the odd row and assigning a value representative of the intensity of photoexposure in the third spectral region from a pixel in a first adjacent even row, and at each pixel location associated with the second spectral region assigning a value representative of the intensity of photoexposure in the first spectral region from an adjacent pixel in the odd row and assigning a value representative of the intensity of photoexposure in the third spectral region from a pixel in a second adjacent even row; and at each even row, at each pixel location associated with the first spectral region assigning a value representative of the intensity of photoexposure in the third spectral region from an adjacent pixel in the even row and assigning a value representative of the intensity of photoexposure in the second spectral region from a pixel in a first adjacent odd row, and at each pixel location associated with the third spectral region assigning a value representative of the intensity of photoexposure in the first spectral region from an adjacent pixel in the even row and assigning a value representative of the intensity of photoexposure in the second spectral region from a pixel in a second adjacent odd row.

8. The method of claim 7, wherein the first and second adjacent odd rows are the same row and the first and second even rows are the same row.

9. The method of claim 7, wherein the first and second adjacent odd rows are separated by an even row and the first and second adjacent even rows are separated by an odd row.

10. The method of claim 1, wherein the array includes a plurality of odd and even rows of pixels, each row having a plurality of uniformly spaced pixels separated by boundaries, each of the odd rows being adjacent to an even row and each of the even rows being adjacent to an odd row, wherein each of the pixels in the odd rows is centered at about a boundary separating adjacent pixels in an even row and each of the pixels in the even rows is centered about a boundary separating adjacent pixels in an odd row.

11. In a camera, the camera having an imaging array of pixels and an optical system for projecting an image onto the imaging array, each pixel in the imaging array being at a location in the array and corresponding with one of a plurality of distinct spectral regions, the imaging array outputting a value representative of an intensity of photoexposure at a pixel location in the array, the improvement comprising:

logic for capturing a single image in exactly one photoexposure period using the array of pixels;

logic for selecting, at each pixel location being associated with a corresponding one of the plurality of spectral regions, at least one neighboring pixel being associated with a spectral region which is distinct from the corresponding spectral region; and logic for assigning the value representative of the intensity of photoexposure associated with the selected neighboring pixel to the pixel location, the assigned value being an estimate of an intensity of photoexposure in the distinct spectral region at the pixel location.

12. The camera of claim 11, the camera further comprising logic for selecting the at least one neighboring pixel based upon a directional location of the nearest pixel relative to the pixel location.

13. The camera of claim 11, the camera further including:

for each pixel location associated with a corresponding one of the plurality of spectral regions, logic for selecting neighboring pixels being associated with each of the plurality of spectral regions which is distinct from the corresponding spectral region; and logic for assigning to the pixel location the values representative of the intensity of photoexposure associated the neighboring pixels for each spectral region which is distinct from the corresponding spectral region, each of the assigned values being representative of an estimate of an intensity of photoexposure in the distinct spectral region at the pixel location, wherein the values representative of the actual intensity photoexposure in the spectral regions at the pixel locations in the imaging array and the estimates of the intensity of photoexposure in the distinct spectral regions provide data representative of a color image having a value representative of an intensity of photoexposure in each of the spectral regions at each pixel location.

14. The camera of claim 11, wherein the imaging array includes alternating odd and even rows of pixels, each of the odd rows having alternating pixels associated with values representative of photoexposure in a first spectral region and a second spectral region, each of the even rows having alternating pixels responsive to the first spectral region and a third spectral region, each of the odd rows being adjacent to an even row and each of the even rows being adjacent to an odd row, the improvement further including:

for each pixel location associated with the first spectral region in each of the odd rows, logic for assigning a value representative of the intensity of photoexposure in the second spectral region from an adjacent pixel in the odd row and assigning a value representative of the intensity of photoexposure in the third spectral region from a pixel in an adjacent even row;

for each pixel location associated with the first spectral region in each of the even rows, logic for assigning a value representative of the intensity of photoexposure in the third spectral region from an adjacent pixel in the even row and assigning a value representative of the intensity of photoexposure in the second spectral region from a pixel in an adjacent odd row;

for each pixel location associated with the second spectral region in each of the odd rows, logic for assigning a value representative of the intensity of photoexposure in the first spectral region from a pixel in a first adjacent even row and assigning a value representative of the intensity of photoexposure in the third spectral region from a pixel in a second adjacent even row; and for each pixel location associated with the third spectral region in each of the even rows, logic for assigning a value representative of the intensity of photoexposure in the first spectral region from a pixel in a first adjacent odd row and assigning a value representative of the intensity of photoexposure in the second spectral region from a pixel in a first adjacent odd row.

15. The camera of claim 14, wherein the first and second adjacent odd rows are the same row and the first and second even rows are the same row.

16. The camera of claim 14, wherein the first and second adjacent odd rows are separated by an even row and the first and second adjacent even rows are separated by an odd row.

17. The camera of claim 11, wherein the imaging array includes alternating odd and even rows of pixels, each of the odd rows having alternating pixels associate with values representative of photoexposure in a first spectral region and a second spectral region, each of the even rows having alternating pixels responsive to the first region and a third spectral region, each of the odd rows being adjacent to an even row and each of the even rows being adjacent to an odd row, the method further including:

for each odd row, for each pixel location associated with the first spectral region, logic for assigning a value representative of the intensity of photoexposure in the second spectral region from an adjacent pixel in the odd row and assigning a value representative of the intensity of photoexposure in the third spectral region from a pixel in a first adjacent even row, and for each pixel location associated with the second spectral region, logic for assigning a value representative of the intensity of photoexposure in the first spectral region from an adjacent pixel in the odd row and assigning a value representative of the intensity of photoexposure in the third spectral region from a pixel in a second adjacent even row; and for each even row, for each pixel location associated with the first spectral region, logic for assigning a value representative of the intensity of photoexposure in the third spectral region from an adjacent pixel in the even row and assigning a value representative of the intensity of photoexposure in the second spectral region from a pixel in a first adjacent odd row, and for each pixel location associated with the third spectral region logic for assigning a value representative of the intensity of photoexposure in the first spectral region from an adjacent pixel in the even row and assigning a value representative of the intensity of photoexposure in the second spectral region from a pixel in a second adjacent odd row.

18. The camera of claim 17, wherein the first and second adjacent odd rows are the same row and the first and second even rows are the same row.

19. The camera of claim 17, wherein the first and second adjacent odd rows are separated by an even row and the first and second adjacent even rows are separated by an odd row.

20. The camera of claim 11, wherein the array includes a plurality of odd and even rows of pixels, each row having a plurality of uniformly spaced pixels separated by boundaries, each of the odd rows being adjacent to an even row and each of the even rows being adjacent to an odd row, wherein each of the pixels in the odd rows is centered at about a boundary separating adjacent pixels in an even row and each of the pixels in the even rows is centered about a boundary separating adjacent pixels in an odd row.

21. A computer readable medium for use in conjunction with an imaging array of pixels, each pixel being at a location in the array and corresponding with one of a plurality of distinct spectral regions, the imaging array outputting a value representative of an intensity of photoexposure at a pixel location in the array, the computer readable medium including computer readable instructions encoded thereon for performing the following:

capturing a single image in exactly one photoexposure period using the array of pixels;

at each pixel location being associated with a corresponding one of the plurality of spectral regions, selecting at least one neighboring pixel being associated with a spectral region which is distinct from the corresponding spectral pixel region; and assigning the value representative of the intensity of photoexposure associated with the selected neighboring pixel to the pixel location, the assigned value being an estimate of an intensity of photoexposure in the distinct spectral region at the pixel location.

22. The computer readable medium of claim 21, the computer readable medium further including computer readable instructions encoded thereon for selecting the at least one neighboring pixel based upon a directional location of the neighboring pixel relative to the pixel location.

23. The computer readable medium of claim 21, the computer readable medium further including computer readable instructions encoded thereon for performing the following:

for each pixel location associated with a corresponding one of the plurality of spectral regions, selecting neighboring pixels being associated with each of the plurality of spectral regions which is distinct from the corresponding spectral region; and assigning to the pixel location the values representative of the intensity of photoexposure associated with the neighboring pixels for each spectral region which is distinct from the corresponding spectral region, each of the assigned values being representative of an estimate of an intensity of photoexposure in the distinct spectral region at the pixel location, wherein the values representative of the actual intensity photoexposure in the spectral regions at the pixel locations in the imaging array and the estimates of the intensity of photoexposure in the distinct spectral regions provide data representative of a color image having a value representative of an intensity of photoexposure in each of the spectral regions at each pixel location.

24. The computer readable medium of claim 21, wherein the imaging array includes alternating odd and even rows of pixels, each of the odd rows having alternating pixels associated with values representative of photoexposure in a first spectral region and a second spectral region, each of the even rows having alternating pixels responsive to the first spectral region and a third spectral region, each of the odd rows being adjacent to an even row and each of the even rows being adjacent to an odd row, the computer readable medium further including computer readable instructions encoded thereon for performing the following:

at each pixel location associated with the first spectral region in each of the odd rows, assigning a value representative of the intensity of photoexposure in the second spectral region from an adjacent pixel in the odd row and assigning a value representative of the intensity of photoexposure in the third spectral region from a pixel in an adjacent even row;

at each pixel location associated with the first spectral region in each of the even rows, assigning a value representative of the intensity of photoexposure in the third spectral region from an adjacent pixel in the even row and assigning a value representative of the intensity of photoexposure in the second spectral region from a pixel in an adjacent odd row;

at each pixel location associated with the second spectral region in each of the odd rows, assigning a value representative of the intensity of photoexposure in the first spectral region from a pixel in a first adjacent even row and assigning a value representative of the intensity of photoexposure in the third spectral region from a pixel in a second adjacent even row; and at each pixel location associated with the third spectral region in each of the even rows, assigning a value representative of the intensity of photoexposure in the first spectral region from a pixel in a first adjacent odd row and assigning a value representative of the intensity of photoexposure in the second spectral region from a pixel in a first adjacent odd row.

25. The computer readable medium of claim 24, wherein the first and second adjacent odd rows are the same row and the first and second even rows are the same row.

26. The computer readable medium of claim 24, wherein the first and second adjacent odd rows are separated by an even row and the first and second adjacent even rows are separated by an odd row.

27. The computer readable medium of claim 21, wherein the imaging array includes alternating odd and even rows of pixels, each of the odd rows having alternating pixels associate with values representative of photoexposure in a first spectral region and a second spectral region, each of the even rows having alternating pixels responsive to the first region and a third spectral region, each of the odd rows being adjacent to an even row and each of the even rows being adjacent to an odd row, the computer readable medium further including computer readable instructions encoded thereon for performing the following:

at each odd row, at each pixel location associated with the first spectral region assigning a value representative of the intensity of photoexposure in the second spectral region from an adjacent pixel in the odd row and assigning a value representative of the intensity of photoexposure in the third spectral region from a pixel in a first adjacent even row, and at each pixel location associated with the second spectral region assigning a value representative of the intensity of photoexposure in the first spectral region from an adjacent pixel in the odd row and assigning a value representative of the intensity of photoexposure in the third spectral region from a pixel in a second adjacent even row; and at each even row, at each pixel location associated with the first spectral region assigning a value representative of the intensity of photoexposure in the third spectral region from an adjacent pixel in the even row and assigning a value representative of the intensity of photoexposure in the second spectral region from a pixel in a first adjacent odd row, and at each pixel location associated with the third spectral region assigning a value representative of the intensity of photoexposure in the first spectral region from an adjacent pixel in the even row and assigning a value representative of the intensity of photoexposure in the second spectral region from a pixel in a second adjacent odd row.

28. The computer readable medium of claim 27, wherein the first and second adjacent odd rows are the same row and the first and second even rows are the same row.

29. The computer readable medium of claim 27, wherein the first and second adjacent odd rows are separated by an even row and the first and second adjacent even rows are separated by an odd row.

30. The computer readable medium of claim 21, wherein the array includes a plurality of odd and even rows of pixels, each row having a plurality of uniformly spaced pixels separated by boundaries, each of the odd rows being adjacent to an even row and each of the even rows being adjacent to an odd row, wherein each of the pixels in the odd rows is centered at about a boundary separating adjacent pixels in an even row and each of the pixels in the even rows is centered about a boundary separating adjacent pixels in an odd row.

31. An image processor for use in conjunction with an imaging array of pixels, each pixel being at a location in the array and corresponding with one of a plurality of spectral regions, the imaging array outputting a value representative of an intensity of photoexposure at a pixel location in the array, the image processor comprising:

logic for capturing a single image in exactly one photoexposure period using the array of pixels;

logic for selecting, at each pixel location being associated with a corresponding one of the plurality of spectral regions, at least one neighboring pixel being associated with a spectral region which is distinct from the corresponding spectral pixel region; and logic for assigning the value representative of the intensity of photoexposure associated with the selected neighboring pixel to the pixel location, the assigned value being an estimate of an intensity of photoexposure in the distinct spectral region at the pixel location.

32. The image processor of claim 31, the image processor further comprising logic for selecting the at least one neighboring pixel based upon a directional location of the neighboring pixel relative to the pixel location.

33. The image processor of claim 31, the image processor further including:

for each pixel location associated with a corresponding one of the plurality of spectral regions, logic for selecting neighboring pixels being associated with each of the plurality of spectral regions which is distinct from the corresponding spectral region; and logic for assigning to the pixel location the values representative of the intensity of photoexposure associated with neighboring pixels for each spectral region which is distinct from the corresponding spectral region, each of the assigned values being representative of an estimate of an intensity of photoexposure in the distinct spectral region at the pixel location, wherein the values representative of the actual intensity photoexposure in the spectral regions at the pixel locations in the array and the estimates of the intensity of photoexposure in the spectral regions provide data representative of a color image having a value representative of an intensity of photoexposure in each of the spectral regions at each pixel location.

34. The image processor of claim 31, wherein the imaging array includes alternating odd and even rows of pixels, each of the odd rows having alternating pixels associated with values representative of photoexposure in a first spectral region and a second spectral region, each of the even rows having alternating pixels responsive to the first spectral region and a third spectral region, each of the odd rows being adjacent to an even row and each of the even rows being adjacent to an odd row, the image processor further including:

for each pixel location associated with the first spectral region in each of the odd rows, logic for assigning a value representative of the intensity of photoexposure in the second spectral region from an adjacent pixel in the odd row and assigning a value representative of the intensity of photoexposure in the third spectral region from a pixel in an adjacent even row;

for each pixel location associated with the first spectral region in each of the even rows, logic for assigning a value representative of the intensity of photoexposure in the third spectral region from an adjacent pixel in the even row and assigning a value representative of the intensity of photoexposure in the second spectral region from a pixel in an adjacent odd row;

for each pixel location associated with the second spectral region in each of the odd rows, logic for assigning a value representative of the intensity of photoexposure in the first spectral region from a pixel in a first adjacent even row and assigning a value representative of the intensity of photoexposure in the third spectral region from a pixel in a second adjacent even row; and for each pixel location associated with the third spectral region in each of the even rows, logic for assigning a value representative of the intensity of photoexposure in the first spectral region from a pixel in a first adjacent odd row and assigning a value representative of the intensity of photoexposure in the second spectral region from a pixel in a first adjacent odd row.

35. The image processor of claim 34, wherein the first and second adjacent odd rows are the same row and the first and second even rows are the same row.

36. The image processor of claim 34, wherein the first and second adjacent odd rows are separated by an even row and the first and second adjacent even rows are separated by an odd row.

37. The image processor of claim 31, wherein the imaging array includes alternating odd and even rows of pixels, each of the odd rows having alternating pixels associate with values representative of photoexposure in a first spectral region and a second spectral region, each of the even rows having alternating pixels responsive to the first region and a third spectral region, each of the odd rows being adjacent to an even row and each of the even rows being adjacent to an odd row, the method further including:

for each odd row, for each pixel location associated with the first spectral region, logic for assigning a value representative of the intensity of photoexposure in the second spectral region from an adjacent pixel in the odd row and assigning a value representative of the intensity of photoexposure in the third spectral region from a pixel in a first adjacent even row, and for each pixel location associated with the second spectral region, logic for assigning a value representative of the intensity of photoexposure in the first spectral region from an adjacent pixel in the odd row and assigning a value representative of the intensity of photoexposure in the third spectral region from a pixel in a second adjacent even row; and for each even row, for each pixel location associated with the first spectral region, logic for assigning a value representative of the intensity of photoexposure in the third spectral region from an adjacent pixel in the even row and assigning a value representative of the intensity of photoexposure in the second spectral region from a pixel in a first adjacent odd row, and for each pixel location associated with the third spectral region logic for assigning a value representative of the intensity of photoexposure in the first spectral region from an adjacent pixel in the even row and assigning a value representative of the intensity of photoexposure in the second spectral region from a pixel in a second adjacent odd row.

38. The image processor of claim 37, wherein the first and second adjacent odd rows are the same row and the first and second even rows are the same row.

39. The image processor of claim 37, wherein the first and second adjacent odd rows are separated by an even row and the first and second adjacent even rows are separated by an odd row.

40. The image processor of claim 31, wherein the array includes a plurality of odd and even rows of pixels, each row having a plurality of uniformly spaced pixels separated by boundaries, each of the odd rows being adjacent to an even row and each of the even rows being adjacent to an odd row, wherein each of the pixels in the odd rows is centered at about a boundary separating adjacent pixels in an even row and each of the pixels in the even rows is centered about a boundary separating adjacent pixels in an odd row.

* * * * *